United States Patent [19]
Zisapel

[11] Patent Number: 5,455,828
[45] Date of Patent: Oct. 3, 1995

[54] CARRIER SENSING MULTIPLE ACCESS/COLLISION DETECTION LOCAL AREA NETWORKS

[76] Inventor: Yehuda Zisapel, 23 Kissufim Street, Tel Aviv 69355, Israel

[21] Appl. No.: 108,076

[22] Filed: Aug. 16, 1993

[30] Foreign Application Priority Data

Aug. 17, 1992 [IL] Israel ........................................ 102843

[51] Int. Cl.$^6$ ................................................ H04L 12/413
[52] U.S. Cl. .......................................... 370/85.3; 370/85.9
[58] Field of Search .................... 340/825.31; 370/85.2, 370/85.3, 85.9, 85.12, 85.13, 94.1; 371/32; 380/23; 455/26.1

[56] References Cited

U.S. PATENT DOCUMENTS

| | | | |
|---|---|---|---|
| 4,584,679 | 4/1986 | Livingston et al. | 370/85.9 |
| 4,807,224 | 2/1989 | Naron et al. | 371/32 |
| 4,809,361 | 2/1989 | Okada et al. | 359/119 |
| 4,894,819 | 1/1990 | Kondo et al. | 370/94.3 |
| 4,959,829 | 9/1990 | Griesing | 370/85.3 |
| 5,079,766 | 1/1992 | Richard et al. | 370/85.3 |
| 5,097,504 | 3/1992 | Camion et al. | 340/825.31 |
| 5,191,613 | 3/1993 | Graziano et al. | 340/825.31 |
| 5,311,593 | 5/1994 | Carmi | 380/23 |

FOREIGN PATENT DOCUMENTS

0431751A1  6/1991  European Pat. Off. .

*Primary Examiner*—Benedict V. Safourek
*Attorney, Agent, or Firm*—Banner & Allegretti, Ltd.

[57] ABSTRACT

A local area network which has at least two CSMA collision domains and at least three LAN stations also includes communication security interface devices, each connected to the at least two CSMA collision domains and to at least one LAN station. The interface devices each include a transmitter, a receiver, apparatus for sensing a transmitted packet having a destination address followed by data, which is transmitted along a given CSMA collision domain, apparatus for comparing the transmitted packet destination address with the local address of the at least one LAN station and apparatus for ensuring that the receiver does not receive data contained in the transmitted packet whose destination address does not match the local address of said at least one LAN station.

10 Claims, 1 Drawing Sheet

CARRIER SENSING MULTIPLE ACCESS/COLLISION DETECTION LOCAL AREA NETWORKS

FIELD OF THE INVENTION

The present invention relates to local area networks generally and more particularly to carrier sensing multiple access/collision detection local area networks.

BACKGROUND OF THE INVENTION

Various types of carrier sensing multiple access (CSMA) local area networks are known. These local area networks prevent data transmission loss during overlapping transmissions by sensing or avoiding such overlapping transmissions, i.e. collisions.

It is known to provide secure communications over CSMA/CD networks. Published European Patent Application 0431751A1 describes repeaters for secure local area networks which read the destination address segment of a data packet to determine whether the data packet is destined for a given receiver or class of receivers. Where the data packet is not destined for a given receiver or class of receivers, it corrupts the frame which it is retransmitting, such as by overwriting, so that the frame cannot be read.

SUMMARY OF THE INVENTION

The present invention seeks to provide an improved local area network of the CSMA type.

There is thus provided in accordance with a preferred embodiment of the present invention a local area network including:

at least two CSMA collision domains;

at least three LAN stations;

communication security interface devices, each connected to the at least two CSMA collision domains and to at least one LAN station, and wherein the interface devices each include a transmitter, a receiver, apparatus for sensing a transmitted packet having a destination address followed by data, which is transmitted along a given CSMA collision domain, apparatus for comparing the transmitted packet destination address with the local address of the at least one LAN station and apparatus for ensuring that the receiver does not receive data contained in the transmitted packet whose destination address does not match the local address of the at least one LAN station.

In accordance with a preferred embodiment of the present invention, the apparatus for ensuring includes apparatus for switching the receiver from the given CSMA collision domain to another CSMA collision domain when the destination address does not match the local address of the at least one LAN station.

Additionally in accordance with a preferred embodiment of the present invention there is provided a local area network including:

at least two CSMA collision domains;

at least three LAN stations;

communication traffic control interface devices, each connected to the at least two CSMA collision domains and to at least one LAN station, and wherein the interface devices each include a transmitter, a receiver, apparatus for sensing a transmitted packet having a destination address and data, which is transmitted along a given CSMA collision domain, apparatus for comparing the transmitted packet destination address with the local address of the at least one LAN station and apparatus for ensuring that a transmitted packet on a given CSMA collision domain whose destination address matches the local address of the at least one LAN station is eventually received by the at least one LAN station notwithstanding that either the transmitter or the receiver is connected to a different CSMA collision domain at the time that the transmitted packet is transmitted.

Preferably the apparatus for ensuring includes apparatus for producing a collision in the given CSMA collision domain when the receiver is unable to receive the transmitted packet.

In accordance with a preferred embodiment of the present invention the apparatus for ensuring includes buffer apparatus for storing the transmitted packet until the receiver is able to receive it.

In one embodiment of the invention, the data in the transmitted packet follows the destination address thereof and the apparatus also includes apparatus for preventing the receiver from receiving data contained in the transmitted packet whose destination address does not match the local address of the at least one LAN station.

In this embodiment, preferably the apparatus for preventing includes apparatus for switching the receiver from the given CSMA collision domain to another CSMA collision domain when the destination address does not match the local address of the at least one LAN station.

BRIEF DESCRIPTION OF THE DRAWING

The present invention will be more fully understood and appreciated from the following detailed description, taken in conjunction with the drawing in which.

DETAILED DESCRIPTION OF A PREFERRED EMBODIMENT

Figure 1:
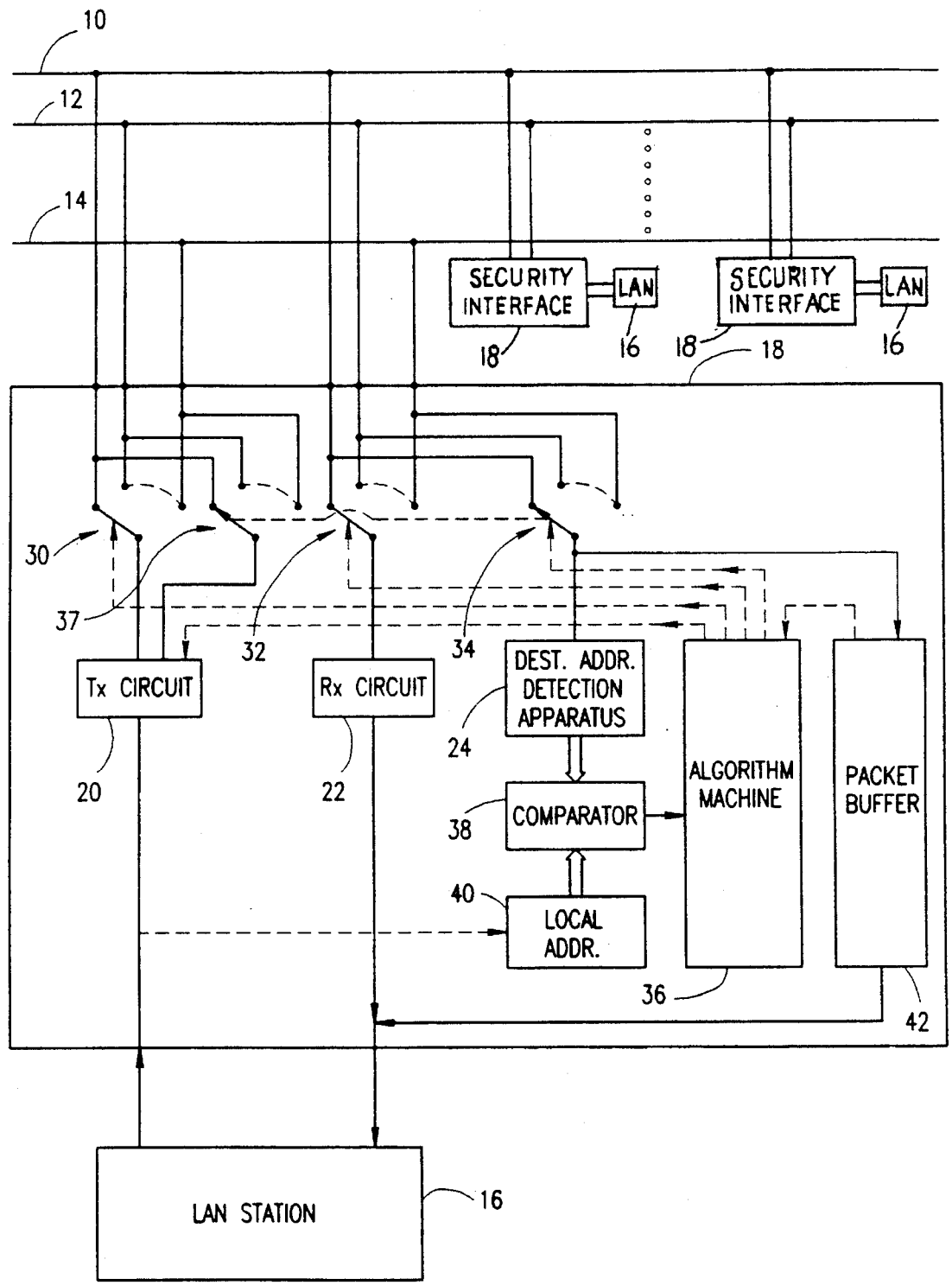
FIG. 1 is a simplified block diagram illustration of part of a local area network constructed and operative in accordance with a preferred embodiment of the present invention in a first operative orientation.

Reference is now made to FIG. 1 which illustrates part of a local area network (LAN) constructed and operative in accordance with a preferred embodiment of the present invention. The LAN includes a plurality of CSMA collision domains, here shown as three domains, indicated by respective reference numerals 10, 12 and 14.

Multiple LAN stations 16 or groups of multiple LAN stations 16 are coupled to the collision domains 10, 12 and 14 via one or more interface apparatus 18 which will now be described in detail. One or more LAN stations 16 may be coupled via a single interface apparatus 18. In the illustrated embodiment, a single LAN station 16 is shown coupled via the interface 18. It will be appreciated that the interface apparatus 18 may be stand-alone or alternatively may reside within the housing of the LAN station 16 or part of a LAN hub or other LAN apparatus.

The interface apparatus 18 generally constitutes a modification of a conventional CSMA/CD transceiver, which is commercially available from the present applicant/assignee, Lannet Ltd. of Tel Aviv, Israel under catalog Number LT-1 and may be configured for Ethernet. The interface apparatus 18 may be configured alternatively for other CSMA LANS.

The interface apparatus 18 comprises a transmitter circuit 20 and a receiver circuit 22, each of which are connected to LAN station 16. Destination address detection apparatus 24 is provided for sensing the destination address of incoming data packets. Preferably the destination address appears at the beginning of the packet and before the data.

Transmitter circuit 20, receiver circuit 22 and destination address detection apparatus 24 are all coupled to one of the plurality of collision domains at a given time by respective switches 30, 32 and 34. Switches 30, 32 and 34 are operated by an algorithm machine 36, which is typically a conventional microprocessor based controller operating according to algorithms which are described hereinbelow. Transmitter circuit 20 is also operative to provide a collision inducing output in response to instructions from the algorithm machine 36 via a switch 37.

The output of the destination address detection apparatus 24 is supplied to a comparator 38 which compares the detected destination address with the local address of the LAN station 16 which is associated therewith and which is stored in a local address store 40. The output of the comparator 38 is supplied to the algorithm machine 36 to indicate whether there exists a match between the detected destination address on an incoming packet and the local address of the LAN station 16.

The operation of the apparatus described above will now be explained briefly with reference to the algorithm employed by algorithm machine 36.

The destination address detection apparatus 24 is initially connected to a given collision domain, typically domain 10, as shown in FIG. 1. Upon receipt of an incoming packet, apparatus 24 determines whether that packet is destined for the associated LAN station 16. If yes, and if receiver circuit 22 is also connected to domain 10, the packet is received by receiver circuit 22 and transferred to LAN station 16.

If the incoming packet is not destined for the associated LAN station 16, the destination address detection apparatus 24 is connected to another collision domain, typically domain 12.

If the incoming packet is destined for the associated LAN station 16 and the receiver circuit 22 is currently connected to another collision domain, i.e. a collision domain other than the one being monitored by the destination address detection apparatus 24, the transmitter circuit 20 is activated by the algorithm machine 36 to transmit along the collision domain being monitored, thereby to cause a collision thereon and to result in retransmission of the packet. In such a case, the transmitter and receiver circuits 20 and 22 respectively are immediately connected to the monitored collision domain, thereby to enable receipt of the retransmitted packet.

In an alternative preferred embodiment of the invention, when an incoming packet destined for the LAN station 16 is detected by the destination address detection apparatus 24 from the LAN to which the switch 34 is connected and the receiver circuit 22 is currently receiving a packet from another LAN via switch 32, the packet received via the switch 34 is stored in a packet buffer 42.

Preferably, the contents of the buffer 42 are forwarded to the LAN station 16 after the end of the current packet received via the switch 32 and the Rx circuit 22. In this embodiment of the invention, the transmitter circuit 20 is not activated by the algorithm machine 36 and does not cause a collision on the monitored collision domain unless the LAN station 16 is already receiving a packet when a new packet destined for it arrives and the packet buffer 42 is not empty.

It will be appreciated by persons skilled in the art that the present invention is not limited by what has been particularly shown and described hereinabove. Rather the scope of the present invention is defined only by the claims which follow:

I claim:

1. A local area network comprising:
   at least two CSMA collision domains;
   at least three LAN stations;
   communication security interface devices, each connected to said at least two CSMA collision domains and to at least one LAN station, and wherein said interface devices each includes a transmitter, a receiver, a sensor sensing a transmitted packet having a destination address followed by data, which is transmitted along a given CSMA collision domain, a comparator and switching assembly for comparing the transmitted packet destination address sensed by the sensor with the local address of said at least one LAN stations and for causing the receiver normally not to receive data contained in the transmitted packet whose destination address does not match the local address or said at least one LAN station, and wherein said comparator assembly comprises apparatus for switching the receiver from the given CSMA collision domain to another CSMA collision domain when the destination address does not match the local address of said at least LAN station.

2. A local area network comprising:
   at least two CSMA collision domains;
   at least three LAN stations;
   communication security interface devices, each connected to said at least two VCSMA collision domains and to at least one LAN station, and wherein said interface devices each include a transmitter, a receiver, a sensor sensing a transmitted packet having a destination address and data, which is transmitted along a given CSMA collision domain, a comparator and switching assembly for comparing the transmitted packet destination address sensed by the sensor with the local address of said at least one LAN station and causing a transmitted packet on a given CSMA collision domain whose destination address matches the local address of said at least one LAN station to be normally received by the at least one LAN station notwithstanding that either the transmitter or the receiver is connected to a different CSMA collision domain at the time that the transmitted packet is transmitted.

3. Apparatus according to claim 2 and wherein said comparator and switching assembly comprises means for producing a collision in the given CSMA collision domain when the receiver is unable to receive the transmitted packet.

4. Apparatus according to claim 2 and wherein said comparator and switching assembly comprises a buffer for storing the transmitted packet until the receiver is able to receive it.

5. Apparatus according to claim 2 and wherein the data in said transmitted packet follows the destination address thereof and also comprising:
   means for preventing the receiver from receiving data contained in the transmitted packet whose destination address does not match the local address of said at least one LAN station.

6. Apparatus according to claim 3 and wherein the data in said transmitted packet follows the destination address thereof and also comprising:

means for preventing the receiver from receiving data contained in the transmitted packet whose destination address does not match the local address of said at least one LAN station.

7. Apparatus according to claim 4 and wherein the data in said transmitted packet follows the destination address thereof and also comprising:

means for preventing the receiver from receiving data contained in the transmitted packet whose destination address does not match the local address of said at least one LAN station.

8. Apparatus according to claim 5 and wherein said means for preventing comprises means for switching the receiver from the given CSMA collision domain to another CSMA collision domain when the destination address does not match the local address of said at least one LAN station.

9. Apparatus according to claim 6 and wherein said means for preventing comprises means for switching the receiver from the given CSMA collision domain to another CSMA collision domain when the destination address does not match the local address of said at least one LAN station.

10. Apparatus according to claim 7 and wherein said means for preventing comprises means for switching the receiver from the given CSMA collision domain to another CSMA collision domain when the destination address does not match the local address of said at least one LAN station.

* * * * *